US009197701B1

(12) United States Patent
Petrov et al.

(10) Patent No.: US 9,197,701 B1
(45) Date of Patent: Nov. 24, 2015

(54) CONSOLIDATED PEER-TO-PEER MEDIA SESSIONS FOR AUDIO AND/OR VIDEO COMMUNICATIONS

(71) Applicant: RingCentral, Inc., San Mateo, CA (US)

(72) Inventors: Aleksei Petrov, Redwood City, CA (US); Patrice Khawam, San Francisco, CA (US); Dmitriy Solovey, San Jose, CA (US); Vlad Vendrow, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/459,512

(22) Filed: Aug. 14, 2014

(51) Int. Cl.
*G06F 15/16* (2006.01)
*H04L 29/08* (2006.01)
*H04L 29/06* (2006.01)

(52) U.S. Cl.
CPC .......... *H04L 67/104* (2013.01); *H04L 65/1046* (2013.01); *H04L 65/1066* (2013.01)

(58) Field of Classification Search
None
See application file for complete search history.

(56) References Cited

U.S. PATENT DOCUMENTS

| 2005/0076098 | A1* | 4/2005 | Matsubara et al. | 709/219 |
| 2008/0010347 | A1* | 1/2008 | Houghton et al. | 709/205 |
| 2009/0135740 | A1* | 5/2009 | Dhara et al. | 370/260 |

OTHER PUBLICATIONS

Definition of Session. Downloaded Mar. 27, 2015 from <http://searchsoa.techtarget.com/definition/session>.*
Cisco, "The Cisco WebEx Node for the Cisco ASR 1000 Series Delivers the Best Aspects of On-Premises and On-Demand Web Conferencing", White Paper, dated 2009, 7 pages.
Cisco, "Medianet Solution Architecture with the WebEx Node", At-A-Glance, dated 2009, 4 pages.
Blue Coat Security Empowers Business, "Assuring the Performance of Cloud-Based Applications", dated 2013, 7 pages.

* cited by examiner

*Primary Examiner* — Scott B Christensen
(74) *Attorney, Agent, or Firm* — Finnegan, Henderson, Farabow, Garrett & Dunner LLP

(57) ABSTRACT

System, methods, and non-transitory computer-readable media storing computer-executable instructions for performing the methods are provided for facilitating electronic audio and/or video communications between multiple parties over a consolidated peer-to-peer media session. The peer-to-peer media session is consolidated in the sense that at least one of the two communications systems of the peer-to-peer media session performs media data relaying functions for at least one other communications system that is also a communications participant.

16 Claims, 5 Drawing Sheets

CONSOLIDATED PEER-TO-PEER MEDIA SESSIONS FOR AUDIO AND/OR VIDEO COMMUNICATIONS

TECHNICAL FIELD

This disclosure relates generally to electronic audio and/or video communications between multiple parties and, more particularly, to facilitating such communications over a consolidated peer-to-peer media session.

BACKGROUND

Today, audio and/or video conferencing is possible over packet-switched data networks, in addition to traditional circuit-switched phone networks. In many cases, the packet-switched data network is an Internet Protocol (IP)-based packet-switched data network ("IP network") such as, for example, the Internet.

In some cases, conferencing is facilitated by a cloud phone system provider. A cloud phone system provider is a business or other organizational entity that provides a hosted phone system on a private or public server system. The hosted phone system is typically implemented in software executing on one or more server computers and provided over an IP network such as the Internet.

One challenge facing cloud phone system providers facilitating audio and/or video conferencing is the computing resources required of the hosted phone system to relay the media data between the endpoint communications devices participating in the conferences. Such relaying may include performing the computationally intensive functions of media data stream mixing and transcoding. Because of the computationally intensive nature of relaying media data, a cloud phone system provider may need to outlay significant capital expenditures on extra server computers, data center resources, and network bandwidth in order to support multiple concurrent electronic audio and/or video conferences with a quality of service level that is acceptable to users.

Given the extra computing resources required of a hosted phone system to adequately support the relaying of conferencing media data, cloud phone system providers would appreciate a solution for facilitating audio and/or video conferences that reduces their burden mixing and transcoding conference media data. The present disclosure provides a solution to this and other needs.

DETAILED DESCRIPTION

Figure 1:
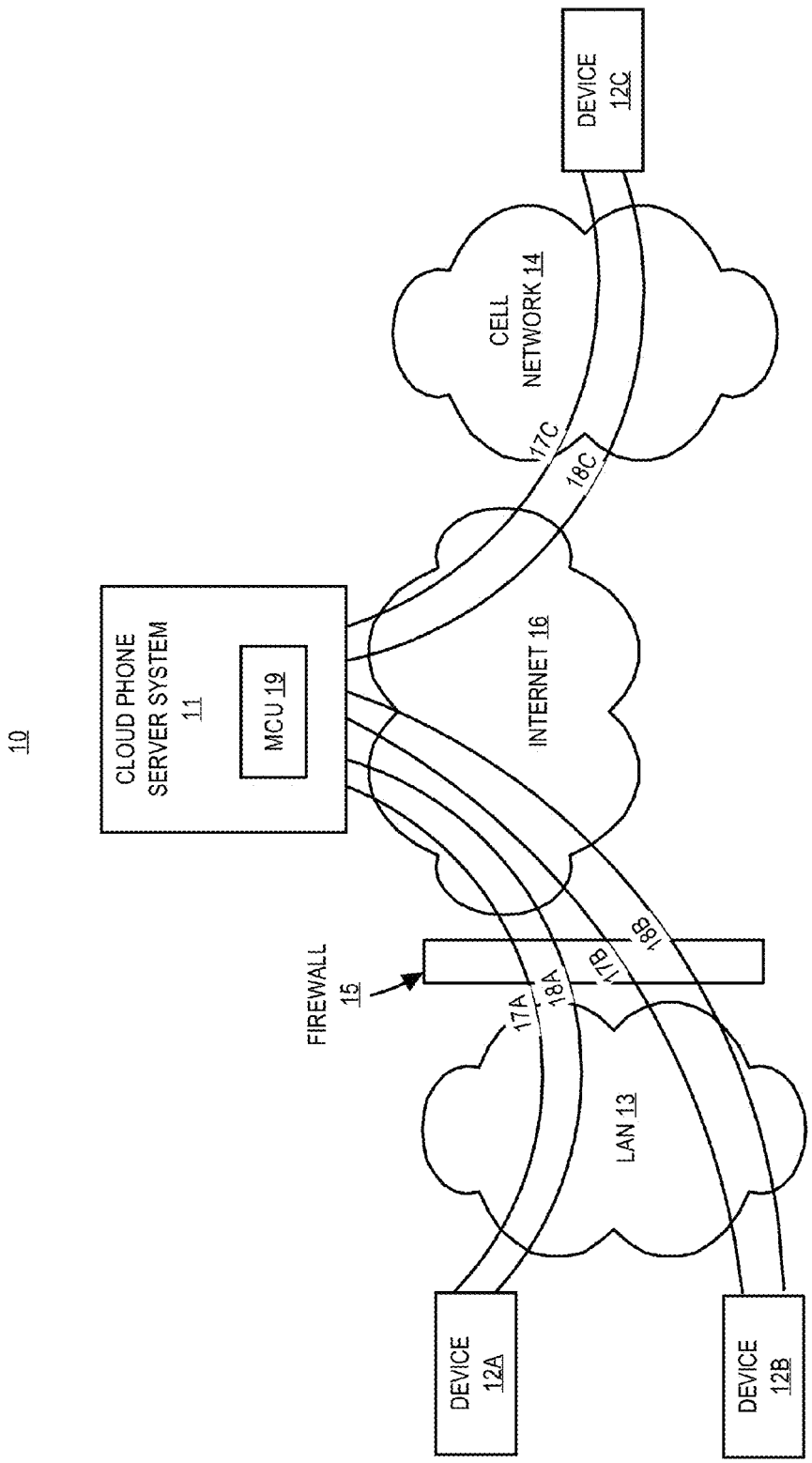
FIG. 1 is a diagram of an example networked cloud phone system that does not leverage a consolidated peer-to-peer media session to facilitate audio and/or video communications.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

The above deficiencies and other problems associated with current approaches for audio and/or video communications between multiple parties are overcome the disclosed methods, systems, and non-transitory computer-readable media.

In one aspect of the present invention, a first method for facilitating an electronic audio and/or video conference over a peer-to-peer media session established between two or more electronic communications devices participating in the conference is performed by one or more server computers. The first method comprises: receiving over a signaling channel, from another electronic communications device, a request to establish a media session with a specified responder; determining that at least one of the two or more electronic communications devices between which the peer-to-peer media session is established has media data relaying capabilities; determining a network address of the at least one electronic communications device that has media data relaying capabilities; and sending the network address over the signaling channel to the other electronic communications device.

In another aspect of the present invention, one or more non-transitory computer-readable media store computer-executable instructions for performing the first method.

In another aspect of the present invention, one or more server computers comprise one or more processors, memory, and one or more programs stored in the memory and configured to be executed by the one or more processors. The programs include instructions for performing the first method.

In another aspect of the present invention, a second method for facilitating an electronic audio and/or video conference over a peer-to-peer media session is performed by a first electronic communications device. The second method comprises: receiving over a signaling channel a request to establish the peer-to-peer media session with a second electronic communications device; sending over the signaling channel an acceptance of the request to establish the peer-to-peer media session; establishing the peer-to-peer media session with the second electronic communications device; receiving media data from a third electronic communications device; and relaying the media data to the second electronic communications device over a data channel of the peer-to-peer media session.

In another aspect of the present invention, one or more non-transitory computer-readable media store computer-executable instructions for performing the second method.

In another aspect of the present invention, a first electronic device comprises one or more processors, memory, and one or more programs stored in the memory and configured to be executed by the one or more processors. The programs include instructions for performing the second method.

These and other aspects of the present invention are described in greater detail below.

System, methods, and non-transitory computer-readable media storing computer-executable instructions for performing the methods are provided for facilitating electronic audio and/or video communications between multiple parties over a consolidated peer-to-peer media session.

The term "media session" as used herein refers to one or more data channels for audio and/or video communications negotiated by two communications systems. A media session can have a "lifetime" from when it is initiated to when it is terminated. During the lifetime of a media session, data channels can be added and removed.

The term "data channel" as used herein refers to the combination of a) a format for the media data of the data channel and b) a transport method for transporting the media data between the two communications systems of the media session to which the data channel belongs. In general, the media data format of a data channel can be audio and/or video. More specifically, the media data format can be a standardized packet format such as, for example, the Real-time Transport Protocol (RTP) for streaming the audio and/or video media data in data packets over one or more packet-switched data networks between the two communications systems. The transport method can be any suitable method for establishing media data streams between the two communications systems. Some possible transport methods include, but are not limited to, the User Datagram Protocol UDP and the Transmission Control Protocol (TCP).

The term "peer-to-peer media session" as used herein refers to a media session in which the media data of the peer-to-peer media session is not relayed between the two communications systems of the media session by a central server system that performs media data mixing and/or transcoding functions. The transport methods of the data channels of a peer-to-peer media session may leverage Network Address Translation (NAT) traversal protocols for establishing media streams between the peer communications systems. Some possible NAT traversal protocols include the Session Traversal Utilities for NAT (STUN) protocol and the Interactive Connectivity Establishment (ICE) protocol.

According to example embodiments of the present disclosure, audio and/or video communications between multiple parties is facilitated by a cloud phone system provider over a consolidated peer-to-peer media session. The peer-to-peer media session is consolidated in the sense that at least one of the two communications systems of the peer-to-peer media session performs media data relaying functions for at least one other communications system that is also a communications participant but is not one of the two communications systems of the consolidated peer-to-peer media session. A participating communications system that performs media data relaying functions is referred to hereinafter as a "consolidator communications system", or just a "consolidator" for short.

By having a consolidator communications system relay media data over a consolidated peer-to-peer media session, the cloud phone system provider can still facilitate the establishment and termination of communication sessions but without having to allocate extra computing resources for relaying media data between the participating communications devices through its servers.

Figure 2:
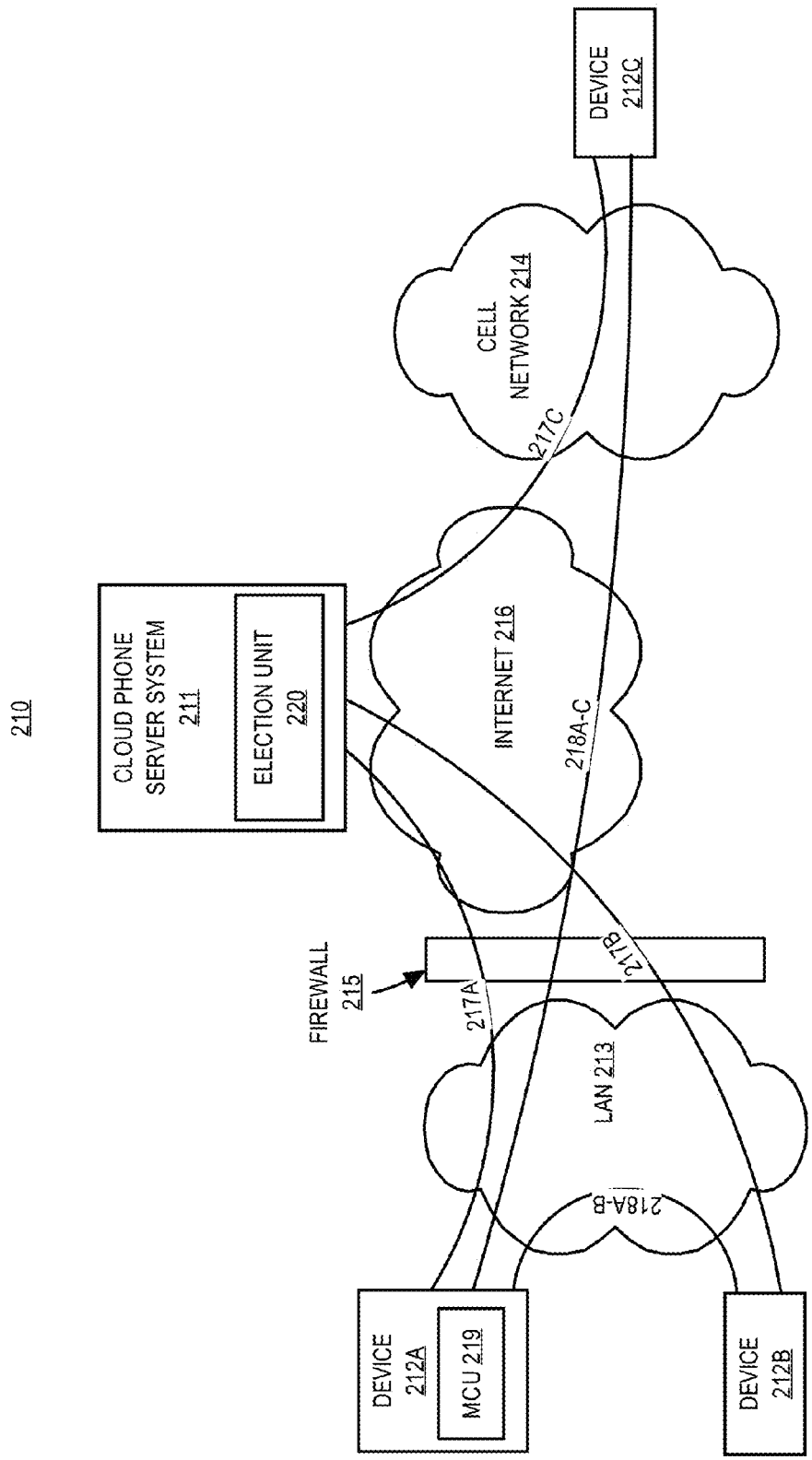
FIG. 2 is a diagram of an example networked cloud phone system that facilitates audio and/or video communications over a consolidated peer-to-peer media session, according to an embodiment of the present disclosure.

This and other advantages of the present disclosure will be apparent from following description including the following description of FIG. 1 and FIG. 2 which contrasts a cloud phone system network configuration that facilitates audio and/or video communications between multiple parties without a consolidated peer-to-peer media session (FIG. 1) and a cloud phone system network configuration according to an embodiment of the present disclosure that facilitates audio and/or video communications between multiple parties over a consolidated peer-to-peer media session (FIG. 2).

Note that while in some example embodiments of the present disclosure a consolidator communications system is an end-user electronic communications device (e.g., a smart phone, a VoIP desktop phone, a laptop computer, etc.) operated by a user participating in a multiple party call such as an audio and/or video conference, a consolidator communications system is a dedicated network device or appliance in other embodiments. For example, the consolidator communications system could be a device purchased or acquired from the cloud phone system provider by a business or organization. The business or organization may then place the consolidator device on their network for the purpose of facilitating audio and/or video conferences over consolidating peer-to-peer media sessions established by the consolidator device with other devices participating in the conference. Thus, a consolidator device may be a participant in a conference in the sense that it sends and receives media data received from other devices participating in the conference over consolidated peer-to-peer sessions. However, a consolidator device may not originate media data of the conference if the consolidator device is only performing media data relaying functions and is not also performing media data capture functions using a microphone and/or video camera.

Turning now to FIG. 1, it is a diagram of an example networked cloud phone system 10 that does not leverage a consolidated peer-to-peer media session to facilitate an audio and/or video conference. System 10 includes a cloud phone server system 11 and three electronic communications devices 12a, 12B, and 12C. Cloud phone server system 11 may include one or more server computers having processors adapted for executing software for facilitating the conference. The three electronic communications devices 12a, 12B, and 12C are participating in the conference by originating and sending media data of the conference captured through a microphone and/or video camera associated with the devices 12A, 12B, and 12C. For example, electronic communications device 12A may be a laptop or desktop computer, electronic communications device 12B may be Voice over Internet Protocol (VoIP) conference phone, and electronic communications device 12C may be a smart phone. Other microphone and/or video camera equipped devices are possible.

In this example, electronic communications devices 12A and 12B are operatively connected to the Internet 16 via Local Area Network (LAN) 13 and through firewall 15 that separates Internet 16 from LAN 13. Also in this example, electronic communications device 12C is operatively connected to the Internet 16 via cellular network 14.

Each of the participating devices 12A, 12B, and 12C has established an associated signaling channel 17 and media session 18 with cloud phone server system 11. In particular, participating device 12A has established signaling channel 17A and media session 18A with cloud phone server system 11, participating device 12B has established signaling channel 17B and media session 18B with cloud phone server system 11, and participating device 12C has established signaling channel 17C and media session 18C with cloud phone server system 11.

Each signaling channel 17 is for sending and receiving conferencing signaling data to and from the centralized cloud phone server system 11. For example, participating device 12A uses signaling channel 17A to send and receive conference signaling data to and from cloud phone server system 11. The conference signaling data sent over a signaling channel 17 includes data for initiating, accepting, managing, and terminating an associated media session. For example, participating device 12A may use signaling channel 17A to initiate media session 18A with cloud phone server system 11. Cloud phone server system 11 may also use signaling channel 17A to accept participating device's 12A initiation. And participating device 12A or cloud phone server system 11 may use signaling channel 17A to terminate media session 18A. Signaling data sent over a signaling channel 17 may conform to a signaling network protocol such as, for example, the Session Initiation Protocol (SIP) and the H.323 protocol.

A drawback to the configuration of system 10 in which each participating device 12A, 12B, and 12C negotiates a separate media session 18A, 18B, and 18C, respectively, with cloud phone server system 11 is that cloud phone server system 11 must be capable of relaying media data received from each of the participating devices 12A, 12B, and 12C during the conference to the other of the two participating devices. For example, if a user of participating device 12B speaks into a microphone associated with device 12B during the conference, the audio signal is encoded as digital media data by device 12B. The media data is then sent to cloud phone server system 11 through a data channel of media session 18B. To facilitate the conference, the cloud phone server system 11 relays the media data received from participating device 12B to the other participating devices 12A and 12C through data channels of their media sessions 18A and 18C, respectively, to be output by speakers at those devices 12A and 12C so that the other users participating in the conference can hear what the user of device 12B said. Such relaying may involve cloud phone server system 11 mixing multiple media data streams together into the same media data stream and possibly transcoding media data from encoding format to another. Both mixing and transcoding can be computationally intensive tasks. For relaying tasks including mixing and transcoding, cloud phone server system 11 may have a media conference unit (MCU), designated as 19 in FIG. 1. To provide adequate support for multiple concurrent real-time audio and/or video conferences with a sufficient quality of service, the provider of cloud phone sever system 11 may need to allocate significant computing resources to MCU 19 which may significantly increase cost to the provider. The drawback of the configuration of system 10 is further exacerbated when, for example, the user of participating device 12B wants to have a private conversation with the user of participating device 12A. Although device 12B is capable of establishing a media session directly with device 12A, nonetheless communications between device 12A and device 12B must go through the intermediary of MCU 19, adding further processing, overhead in bandwidth, additional complexity, and increased likelihood of errors due to the plurality of participating devices and media sessions involved.

In contrast to the system of FIG. 1, FIG. 2 is a diagram of an example networked cloud phone system 210 according to an example embodiment of the present disclosure that facilitates an audio and/or video conference over a consolidated peer-to-peer media session.

In system 210, like devices 12A, 12B, and 12C of system 10 of FIG. 1, electronic communications devices 212A, 212B, and 212C participate in an audio and/or video conference facilitated by cloud phone server system 211. However, unlike devices 12A, 12B, and 12C of system 10 of FIG. 1, none of the devices 212A, 212B, or 212C have established a media session with cloud phone server system 211. Instead, device 212A has established consolidated peer-to-peer media session 218A-C with device 212C over LAN 213, Internet 216, and cell network 214. Device 212A has also established peer-to-peer media session 218A-B with device 212B over LAN 213. Thus, cloud phone server system 211 may function only as a signaling server as opposed to an intermediary server system that functions as both the signaling server and the media relaying server. By functioning only as a signaling server, the provider of cloud phone server system 211 can avoid financial costs associated with providing adequate computing and networking resources (e.g., processors and network bandwidth) to provide media relaying functionality.

Sessions 218A-C are each "peer-to-peer" because the media data transported through either media session 218A-C is not being relayed by cloud phone server system 211.

Moreover, sessions 218A-C are also "consolidated" because device 212A relays media data received from device 212B through peer-to-peer media session 218A-B to device 212C through consolidated peer-to-peer media session 218A-C. Device 212A also relays media data received from device 212C through consolidated peer-to-peer media session 218A-C to device 212 through peer-to-peer media session 218A-B. For relaying, device 212A is configured with a media conference unit (MCU) 219 for performing conference media data relaying functions such as mixing and/or transcoding media data. Thus, in the example system 210, device 212A is a consolidator communications system.

Devices 212A, 212B, and 212C are associated with signaling channels 217A, 217B, and 217C respectively for communicating conference signaling data with cloud phone server system 211.

Cloud phone server system 211 includes an election unit 220. A function of the election unit 220 is to determine which of the devices 212 participating in the conference, if any, are capable of being a consolidator. Such determination by election unit 220 can be based on capabilities advertised by the devices 212 over their associated signaling channels 217 to cloud phone server system 211. For example, when initiating a media session over signaling channel 217A, device 212A can advertise its MCU 219 capabilities to election unit 220 of cloud phone server system 211. In other examples, the election unit 220 includes a list of media communications capabilities when, for instance, a device such as device 212A registers with the cloud phone server system 211. In some embodiments, the registration with election unit 220 occurs when a device joins a telephone call, or an audio and/or video conference managed by the cloud phone server s If an election of a consolidator for a conference has been made by election unit 220, cloud phone server system 211 can inform non-elected devices over their respective signaling channels of the network address or other identifier of the elected consolidator device. The non-elected devices can then use this identifying information to establish peer-to-peer or consolidated peer-to-peer media sessions with the elected device. The election and consolidation process for facilitating an audio and/or video conference will now be further explained by example with reference to FIG. 3.

Figure 3:
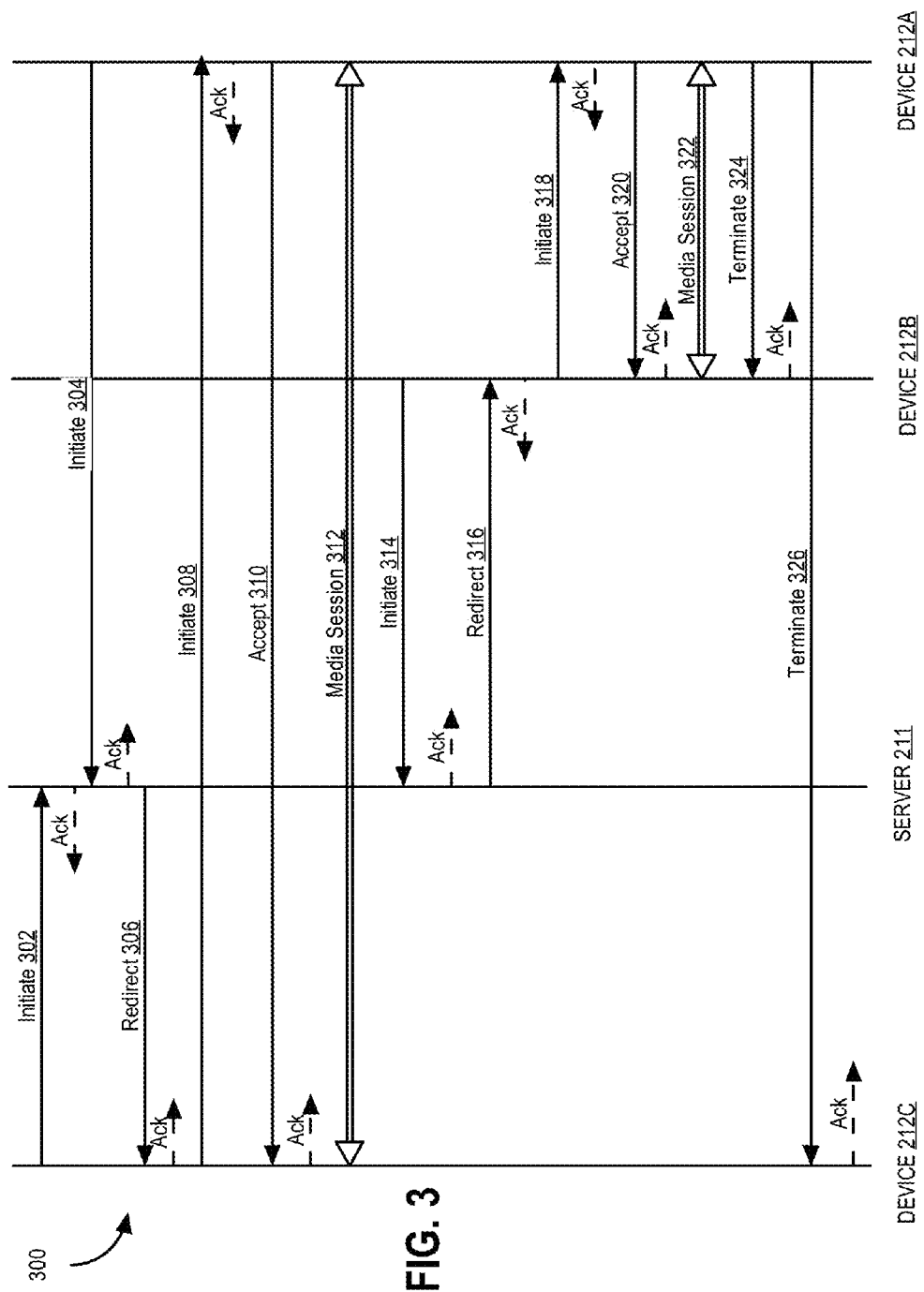
FIG. 3 is a network interaction diagram of an example process for facilitating audio and/or video communications over a consolidated peer-to-peer media session according to an embodiment of the present disclosure.

FIG. 3 is a network interaction diagram of an example process 300 for facilitating an audio and/or video conference over a consolidated peer-to-peer media session according to an embodiment of the present disclosure. Process 300 will be explained with reference to system 210 of FIG. 2.

At step 302, cloud phone server system 211 receives from device 212C over signaling channel 217C a request to initiate a media session with a responder specified in the request. The responder may correspond to the audio and/or video conference. For example, the responder may be a conference bridge phone number or other information identifying the audio and/or video conference that a user of device 212C can provide to the device 212 to dial-in or otherwise join or participate in the audio and/or video conference. Cloud phone system server 211 may acknowledge receipt of the initiate session request received from device 212C with a return acknowledgement message.

Sometime later, at step 304, cloud phone server system 211 receives from device 212A over signaling channel 217A a request to initiate a media session with a responder specified in the request. The response may also correspond to the audio and/or video conference. In addition, device 212 may advertise its relaying capabilities to cloud phone server system 211 in the request. Cloud phone system server 211 may acknowledge receipt of the imitate session request received from device 212A with a return acknowledgement message.

Based on the relaying capabilities advertised by device 212A in the initiate session request at step 304, election unit 220 of cloud phone server system 211 may elect device 212A as a consolidator device for the audio and/or video conference. A notification (not shown) of this election may be sent to device 212A.

Based on the election of device 212A as a consolidator device, cloud phone system server 211 sends at step 306 a redirect message to device 212C over signaling channel 217C. The redirect message contains a network address of device 212A. The network address can be an Internet Protocol (IP) address, a Domain Name System (DNS) domain name resolvable to an IP address through DNS, or other information resolvable to an IP address of device 212A. Device 212C may acknowledge receipt of the redirect message received from cloud phone system server 211 with a return acknowledgment message.

Based on receipt of the redirect message at step 306 and using the network address of device 212A learned at step 306, device 212C may send at step 308 an initiate session request through system 211 to device 212A over peer-to-peer signaling channels 217C and 217A. Device 212A may acknowledge receipt of the initiate session message received from device 212C with a return acknowledgment message.

Based on the initiate session request received at step 308, device 212A may send at step 310 an accept session request message to device 212C via signaling channel 217A to be forwarded by cloud phone system server 211 to device 212C over signaling channel 217C. The accept message may select a data channel (i.e., a combination of a media data format and a transport method) for the media session offered by device 212C in the initiate session request sent at step 308. Device 212C may acknowledge receipt of the accept session message received from device 212A with a return acknowledgment message.

At step 312, devices 212A and 212C communicate media data in the selected format and using the selected transport method over peer-to-peer media session 218A-C. With the establishment of peer-to-peer media session 218A-C, devices 212A and 212C are now participants in the audio and/or video conference. If, for any reason, devices 212A and 212C are unable to establish peer-to-peer media session 218A-C, then, as a fallback, devices 212A and 212C may participate in the audio and/or video conference by establishing media sessions with cloud phone server system 211, assuming cloud phone server system 211 has relaying capabilities.

At step 314, device 212B attempts to join the audio and/or video conference by sending an initiate session request to cloud phone system server 211 over signaling channel 217B. Like the initiate session requests at steps 302 and 304 from devices 212C and 212A respectively, the initiate session request at step 314 can specify a responder corresponding to the audio and/or video conference. Cloud phone system server 211 may acknowledge receipt of the initiate session request received from device 212B with a return acknowledgement message.

Based on the election of device 212A as a consolidator device, cloud phone system server 211 sends at step 316 a redirect message to device 212B over signaling channel 217B. The redirect message contains a network address of device 212A. Device 212B may acknowledge receipt of the redirect message received from cloud phone system server 211 with a return acknowledgment message.

Based on receipt of the redirect message at step 316 and using the network address of device 212A learned at step 316, device 212B may send at step 318 an initiate session request to cloud phone system server 211 over signaling channel 217B which then forwards the initiate session request to device 212A over signaling channel 217A. Device 212A may acknowledge receipt of the initiate session message received from device 212B with a return acknowledgment message.

Based on the initiate session request received at step 318, device 212A may send at step 320 an accept session request message to device 212B via signaling channel 217A to be forwarded by cloud phone system server 211 to device 212B over signaling channel 217B. The accept message may select a data channel (i.e., a combination of a media data format and a transport method) for the media session offered by device 212B in the initiate session request sent at step 318. Device 212B may acknowledge receipt of the accept session message received from device 212A with a return acknowledgment message.

At step 322, devices 212A and 212B communicate media data in the selected format and using the selected transport method over peer-to-peer media session 218A-B. With the establishment of peer-to-peer media session 218A-B, device 212B is now a participant in the audio and/or video conference. If, for any reason, devices 212A and 212B are unable to establish peer-to-peer media session 218A-B, then, as a fallback, devices 212A and 212B may participate in the audio and/or video conference by establishing media sessions with cloud phone server system 211, assuming cloud phone server system 211 has relaying capabilities.

If device 212B and 212A are able to establish peer-to-peer media session 218A-B, then device 212A relays media data received from device 212B over peer-to-peer media session 218A-B to device 212C over peer-to-peer media session 218A-C. In addition, device 212A relays media data received from device 212C over peer-to-peer media session 218A-C to device 212B over peer-to-peer media session 218A-B. Significantly, in this configuration, cloud phone system server 211 does not need to perform any media data relaying functions (e.g., mixing or transcoding) in order to facilitate the audio and/or video conference.

While foregoing example embodiments involve a single consolidated peer-to-peer media session in the context of three devices participating in a conference, it is also possible for a conference to involve multiple consolidated peer-to-peer media sessions and more than three electronic communications devices. For example, FIG. 4 is a diagram of an example networked cloud phone system 410 that facilitates an audio and/or video conference between six participating devices over two consolidated peer-to-peer media sessions, according to an embodiment of the present disclosure.

Figure 4:
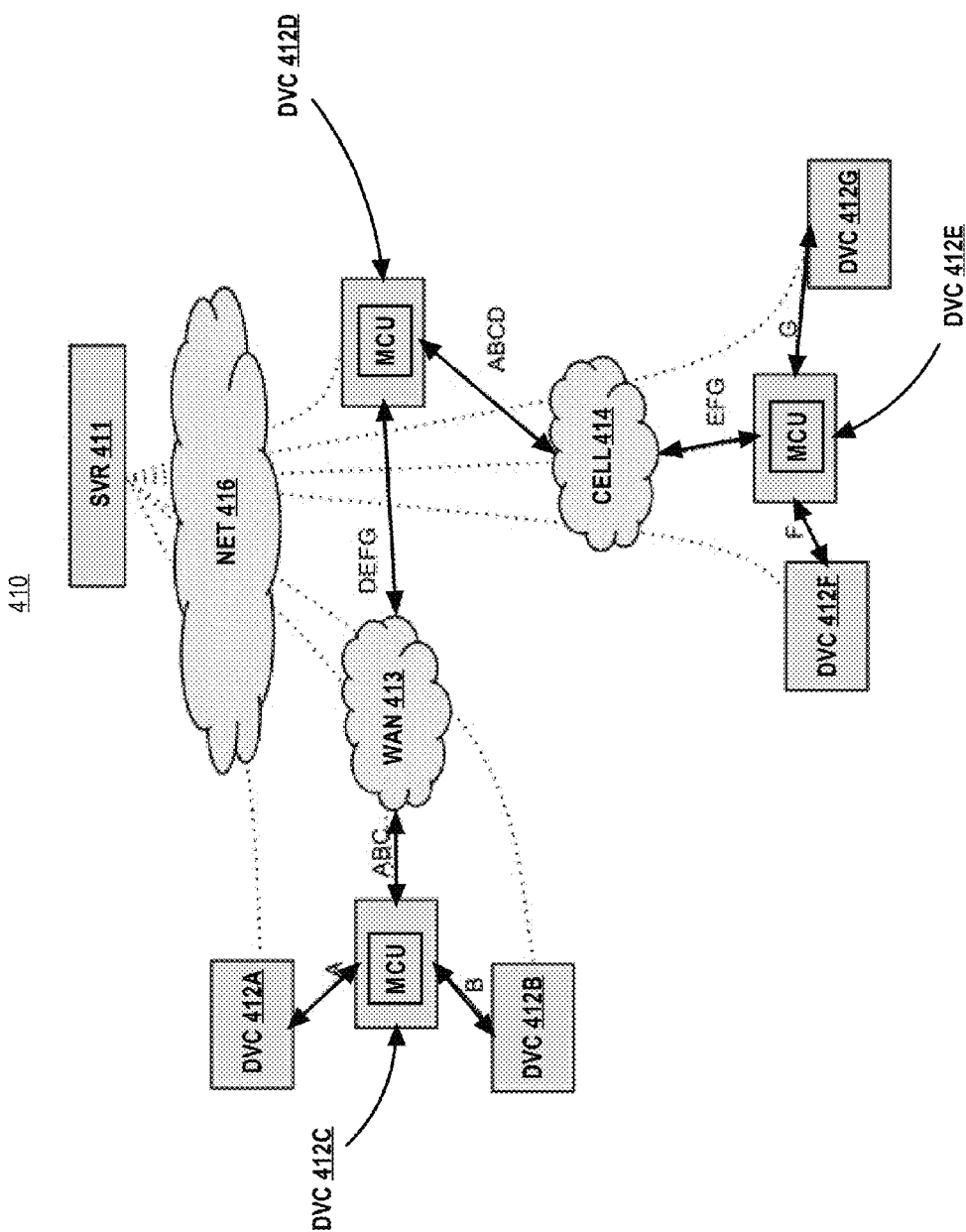
FIG. 4 is a diagram of an example networked cloud phone system that facilitates audio and/or video communications over multiple consolidated peer-to-peer media sessions, according to an embodiment of the present disclosure.

Each of the six participating devices 412A, 412B, 412C, 412D, 412E, 412F, and 415G have established signal channels with cloud phone server system 411 as represented by dashed lines in FIG. 4. In particular, device 412A has established a signaling channel with server system 411 over data network 416. Devices 412B and devices 412C have each established respective signaling channels with server system 411 over network 416 by way of wide area network (WAN) 412. Device 412D has established a signaling channel with server system 411 over network 416. Devices 412E, 412F, and 412G have each established respective signaling channels with server system 411 over network 416 by way of cellular network 414.

In an embodiment, network 416 is the Internet. In an embodiment, network 413 is a local area network (LAN) such as a corporate, business, government or campus network. Devices 412A, 412B, and 412C may be located near each other in one geographic location and device 412D may be located in a different geographic location. For example, devices 412, 412B, and 412C may be located in an office in San Francisco, Calif., USA and device 412D may be located in an office in New York, N.Y., USA. Devices 412E, 412F, and 412G may be co-located but a location geographically distant from where devices 412A, 412B, and 412C are located and from where device 412D is located. Devices 412A and 412B may communicate by wired or wireless network (not shown) with device 412C. For example, the wired or wireless network may be a local area network (LAN), a wireless local area network (WLAN), or a Bluetooth network. Similarly, devices 412F and 412G may communicate by wired or wireless network with device 412E.

In this example, devices 412C, 412D, and 412E have been elected by the election unit of server system 411 as consolidator devices for the audio and/or video conference. Such election may be based, for example, on the devices 412C, 412D, and 412E advertising their respective media conference unit (MCU) capabilities to server system 411 over respective signaling channels. Note that one or more of the non-elected devices 412A, 412B, 412F, and 412G may also have media mixing and/or media transcoding capabilities.

When multiples devices have MCU capabilities, server system 411 may elect one device over another device based on advertised device capabilities that indicates that one of the devices is better suited to function as a consolidator device when compared to the other devices. For example, server system 411 may elect device 412C as a consolidator device over devices 412A and 412B based on device 412C's greater processing capabilities as measured by CPU speed.

In this example, there are two consolidated peer-to-peer media sessions. One consolidated peer-to-peer media session is established over WAN 413 between device 412C and device 412D. Another consolidated peer-to-peer media session is established over cellular network 414 between device 412E and device 412D.

During the conference, consolidator device 412C receives separate media data A and B from devices 412A and 412B, respectively. Device 412C mixes the media data A and B together with its own media data C and sends the mixed media data A, B, and C to device 412D over the consolidated peer-to-peer media session it has established with device 412D. Prior to mixing the media data A and B received from devices 412A and 412B together with its own media data C, device 412C may optionally transcode one or both of the media data A or B received from devices 412A and 412B.

Consolidator device 412D mixes the mixed media data A, B, and C it receives from device 412C with its own media data D and sends the mixed media data A, B, C, and D to device 412E. Prior to mixing the media data A, B, and C received from device 412C together with its own media data D, device 412D may optionally transcode some or all of media data A, B, or C.

Consolidator device 412E receives separate media data F and G from devices 412F and 412G, respectively. Device 412E mixes the media data F and G together with its own media data E and sends the mixed media data E, F, and G to device 412D over the consolidated peer-to-peer media session it has established with device 412D. Prior to mixing the media data F and G received from devices 412F and 412G together with its own media data E, device 412E may optionally transcode one or both of the media data F or G received from devices 412F and 412G.

Consolidator device 412D mixes the mixed media data E, F, and G it receives from device 412E with its own media data D and sends the mixed media data D, E, F, and G to device 412C. Prior to mixing the media data E, F, and G received from device 412E together with its own media data D, device 412D may optionally transcode some or all of media data E, F, or G.

Consolidator device 412C sends the mixed media data D, E, F, and G it receives from device 412D to devices 412A and 412B. Consolidator device 412E sends the mixed media data A, B, C, and D it receives from device 412D to devices 412F and 412G. In this way, a multiple-party conference over multiple consolidated peer-to-peer media sessions is facilitated.

The systems, methods, and apparatuses of the present disclosure may be implemented on one or more computing devices. Such a computing device may be implemented in various forms including, but not limited to, a client, a server, a network device, a mobile device, a laptop computer, a desktop computer, a workstation computer, a personal digital assistant, a blade server, a mainframe computer, and other types of computers. The computing device described below and its components, including their connections, relationships, and functions, is meant to be exemplary only, and not meant to limit implementations of the systems, methods, and apparatuses described in this specification. Other computing devices suitable for implementing the systems, methods, and apparatuses of the present disclosure may have different components, including components with different connections, relationships, and functions.

Figure 5:
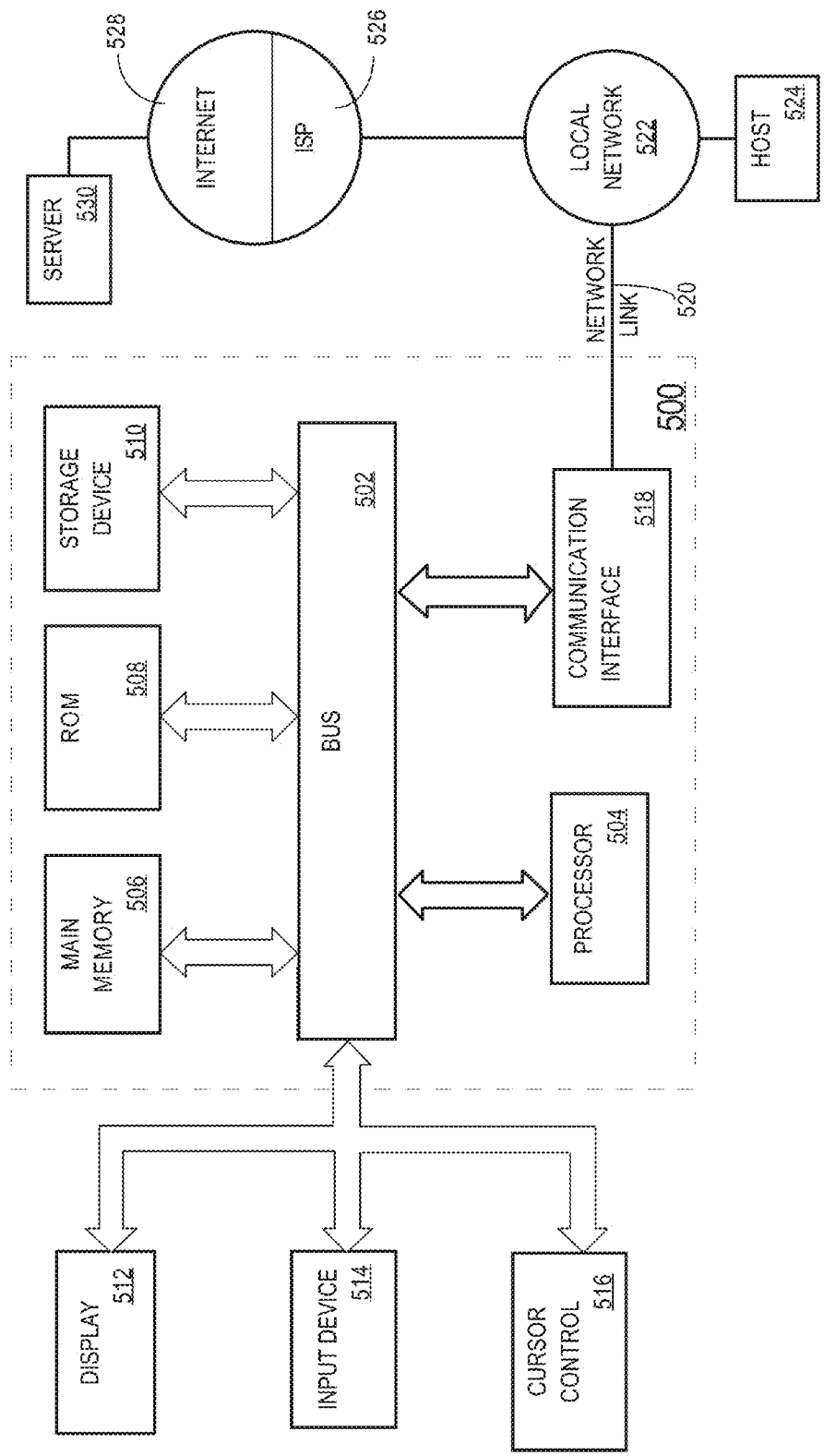
FIG. 5 is a block diagram of an example computing device with which embodiments of the present disclosure may be implemented.

FIG. 5 is a block diagram that illustrates an example of a computing device 500 suitable for implementing the systems, methods, and apparatuses of the present disclosure. Computing device 500 includes a bus 502 or other communication mechanism for communicating information, and a hardware processor 504 coupled with bus 502 for processing information. Hardware processor 504 may be, for example, a general purpose microprocessor or a system on a chip (SoC).

Computing device 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computing device 500 into a special-purpose computing device that is customized to perform the operations specified in the instructions.

Computing device 500 further includes a read only memory (ROM) 508 or other static storage device coupled to bus 502 for storing static information and instructions for processor 504.

A storage device 510, such as a magnetic disk, optical disk, or solid-state drive is provided and coupled to bus 502 for storing information and instructions.

Computing device 500 may be coupled via bus 502 to a display 512, such as a liquid crystal display (LCD) or other electronic visual display, for displaying information to a computer user. Display 512 may also be a touch-sensitive display for communicating touch gesture (e.g., finger or stylus) input to processor 504.

An input device 514, including alphanumeric and other keys, is coupled to bus 502 for communicating information and command selections to processor 504.

Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computing device 500 may implement the methods described herein using customized hard-wired logic, one or more application-specific integrated circuits (ASICs), one or more field-programmable gate arrays (FPGAs), firmware, or program logic which, in combination with the computing device, causes or programs computing device 500 to be a special-purpose machine.

The methods herein may also be performed by computing device 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computing device 500 also includes a communication interface 518 coupled to bus 502. Communication interface 518 provides a two-way data communication coupling to a network link 520 that is operatively connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computing device 500, are example forms of transmission media.

Computing device 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

A software system is typically provided for controlling the operation of computing device 500. The software system, which is usually stored in main memory 506 and on fixed storage (e.g., hard disk) 510, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, LINUX, UNIX, IOS, ANDROID, and so forth.

One or more application(s), such as client software or "programs" or set of processor-executable instructions, may also be provided for execution by computer 500. The application(s) may be "loaded" into main memory 506 from storage 510 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computing device in accordance with instructions from OS and/or application(s). The graphical user interface also serves to display the results of operation from the OS and application(s).

It should be understood that, although the terms first, second, etc. may be used herein and in the claims to describe various elements, these elements should not be limited by these terms. These terms are only used to distinguish one element from another. For example, a first device could be termed a second device, and similarly, a second device could be termed a first device, without departing from the scope of the present disclosure.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. A method performed by one or more server computers for facilitating an electronic audio and/or video conference over a peer-to-peer media session established between two or more electronic communications devices participating in the conference, the method comprising:
   receiving, by the one or more server computers, over a signaling channel, from another electronic communications device, a request to establish a media session with a specified responder, wherein the another electronic communication device is separate from the two or more electronic communications devices participating in the conference;
   determining, by the one or more server computers, that an electronic communications device, out of the two or more electronic communications devices between which the peer-to-peer media session is established, is configured to relay media data over a data channel of the established peer-to-peer media session, wherein the peer-to-peer media session is established directly between the two or more electronic communications devices bypassing the one or more server computers;
   identifying, by the one or more server computers, a network address of the electronic communications device determined to have media data relaying capabilities; and
   sending, by the one or more server computers, the identified network address over the signaling channel to the another electronic communications device to enable the another electronic communication device to join the established peer-to-peer media session by sending from the another electronic communication device a join request directly to the electronic communication device determined to have media relaying capabilities.

2. The method of claim 1, further comprising:
   receiving, by the one or more server computers, over the signaling channel, from the another electronic communications device, the bin request to establish a media session with the at least one electronic communications device that has media data relaying capabilities; and
   forwarding, by the one or more server computers, the loin request to establish a media session from the another electronic communications device to the at least one electronic communications device that has media data relaying capabilities over a signaling channeling associated with the at least one electronic communications device that has media data relaying capabilities.

3. The method of claim 1, wherein, when the loin request to establish the media session is received from the another electronic communications device, the another electronic communications device is not then currently participating in the conference.

4. One or more non-transitory computer-readable media storing instructions which, when executed by one or more server computers, cause performance of the method as recited in claim 1.

5. The method of claim 1, wherein the network address is used for establishing another peer-to-peer media session between the electronic communications device that has media data relaying capabilities and the another electronic communication device.

6. A method, performed by a first electronic communications device, for facilitating an electronic audio and/or video conference over a peer-to-peer media session with a second electronic communications device, the method comprising:
   providing another peer-to-peer media session between the first electronic communications device and a third electronic communications device;
   receiving over a signaling channel a request to establish the peer-to-peer media session with the second electronic communications device, wherein the request is received directly from the second electronic communications device without being received by one or more server computers, and wherein the second electronic communications device received a network address of the first electronic communications device over another signaling channel between the second electronic communications device and the one or more server computers;
   sending over the signaling channel an acceptance of the request to establish the peer-to-peer media session, wherein the signaling channel is separate and distinct from the peer-to-peer media session and the another peer-to-peer media session, and wherein the peer-to-peer media session and the another peer-to-peer media session bypass the one or more server computers;
   based on the request, establishing the peer-to-peer media session with the second electronic communications device;
   receiving media data from the third electronic communications device over the another peer-to-peer media session; and
   relaying the media data received from the third electronic communications device to the second electronic communications device over a data channel of the established peer-to-peer media session between the first electronic communication device and the second electronic communication device.

7. The method of claim 6, wherein the relaying comprises mixing the media data received from the third electronic communications device with other media data and sending the mixed media data to the second electronic communications device over the data channel of the peer-to-peer media session.

8. The method of claim 6, wherein the relaying comprises transcoding the media data received from the third electronic communications device and sending the transcoded media data to the second electronic communications device over the data channel of the peer-to-peer media session.

9. One or more non-transitory computer-readable media storing instructions which, when executed by a first electronic communications device, cause performance of the method as recited in claim 6.

10. One or more server computers, comprising:
    one or more processors;
    a memory for storing one or more programs configured to be executed by the one or more processors, the programs including instructions for facilitating an electronic audio and/or video conference over a peer-to-peer media session established between two or more electronic communications devices participating in the conference, the programs including instructions for:
receiving, by the one or more server computers, over a signaling channel, from another electronic communications device, a request to establish a media session with a specified responder, wherein the another electronic communication device is separate from the two or more electronic communications devices participating in the conference;
determining, by the one or more server computers, that an electronic communications device, out of the two or more electronic communications devices between which the peer-to-peer media session is established, is configured to relay media data over a data channel of the established peer-to-peer media session, wherein the peer-to-peer media session is established directly between the two or more electronic communications devices bypassing the one or more server computers;
identifying, by the one or more server computers, a network address of the electronic communications device determined to have media data relaying capabilities; and
sending, by the one or more server computers, the identified network address over the signaling channel to the another electronic communications device to enable the another electronic communication device to join the established peer-to-peer media session by sending from the another electronic communication device a join request directly to the electronic communication device determined to media relaying capabilities.

11. The one or more server computers of claim 10, the programs further including instructions for:
receiving, by the one or more server computers, over the signaling channel, from the another electronic communications device, the bin request to establish a media session with the at least one electronic communications device that has media data relaying capabilities; and
forwarding, by the one or more server computers, the join request to establish a media session from the another electronic communications device to the at least one electronic communications device that has media data relaying capabilities over a signaling channel associated with the at least one electronic communications device that has media data relaying capabilities.

12. The one or more server computers of claim 10, wherein, when the loin request to establish the media session is received from the another electronic communications device, the another electronic communications device is not then currently participating in the conference.

13. The one or more server computers of claim 10, wherein the network address is used for establishing another peer-to-peer media session between the electronic communications device that has media data relaying capabilities and the another electronic communication device.

14. A first electronic communications device, comprising:
one or more processors;
a memory for storing one or more programs configured to be executed by the one or more processors, the programs including instructions for facilitating an electronic audio and/or video conference over a peer-to-peer media session with a second electronic communications device, the programs including instructions for:
providing another peer-to-peer media session between the first electronic communications device and a third electronic communications device;
receiving over a signaling channel a request to establish the peer-to-peer media session with the second electronic communications device, wherein the request is received directly from the second electronic communications device without being received by one or more server computers, and wherein the second electronic communications device received a network address of the first electronic communications device over another signaling channel between the second electronic communications device and the one or more server computers;
sending over the signaling channel an acceptance of the request to establish the peer-to-peer media session, wherein the signaling channel is separate and distinct from the peer-to-peer media session and the another peer-to-peer media session, and wherein the peer-to-peer media session and the another peer-to-peer media session bypass the one or more server computers;
based on the request, establishing the peer-to-peer media session with the second electronic communications device;
receiving media data from the third electronic communications device over the another peer-to-peer media session; and
relaying the media data received from the third electronic communications device to the second electronic communications device over a data channel of the established peer-to-peer media session between the first electronic communication device and the second electronic communication device.

15. The first electronic communications device of claim 14, wherein the relaying comprises mixing the media data received from the third electronic communications device with other media data and sending the mixed media data to the second electronic communications device over the data channel of the peer-to-peer media session.

16. The first electronic communications device of claim 14, wherein the relaying comprises transcoding the media data received from the third electronic communications device and sending the transcoded media data to the second electronic communications device over the data channel of the peer-to-peer media session.

* * * * *